Dec. 28, 1948.  E. W. BURROUGHS, SR., ET AL  2,457,443
TROLLEY FOR ELECTRIC CRANES
Filed Oct. 1, 1948
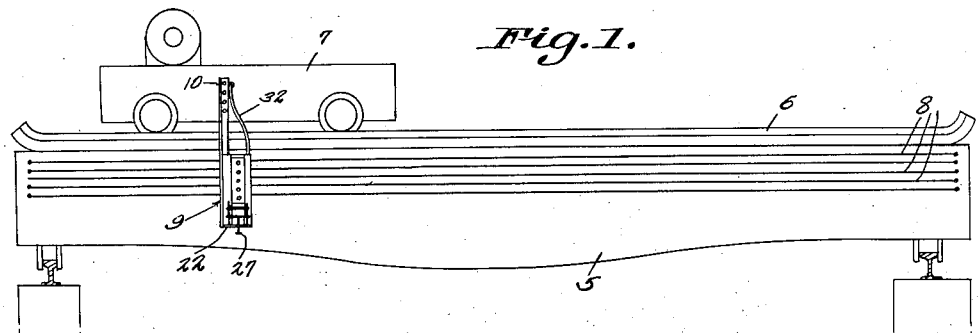
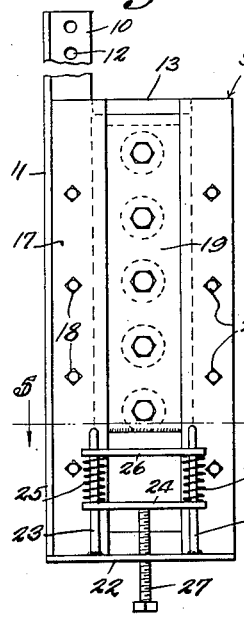 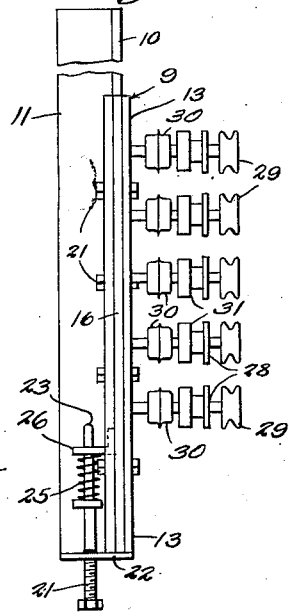 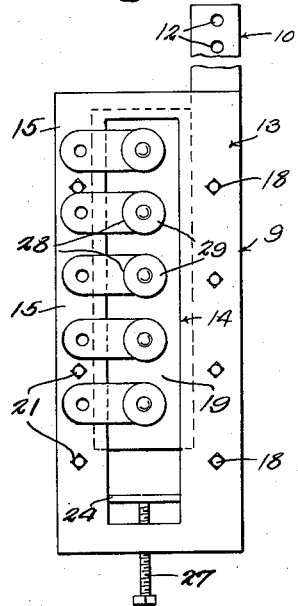
*E. W. Burroughs Sr.*
*W. J. Byrd*
*M. P. Seawell*
INVENTORS.
BY *C. A. Snow & Co.*
ATTORNEYS.

Patented Dec. 28, 1948

2,457,443

UNITED STATES PATENT OFFICE 2,457,443

TROLLEY FOR ELECTRIC CRANES

Eugene W. Burroughs, Sr., Norfolk, William J. Byrd, Suffolk, and Miles P. Seawell, Norfolk, Va.

Application October 1, 1948, Serial No. 52,262

4 Claims. (Cl. 191—45)

By way of illustration, it might be stated that with crane construction of the traveling beam type, wherein a trolley arm having a plurality of trolley wheels thereon, operating over trolley wires, it often happens that because of slack in the trolley wires, the trolley wheels moving in a direct line, will move out of contact with the slackened trolley wires, particularly at the ends thereof, with the result that the electric current to the motors of the carriage of the crane will be cut off.

It is, therefore, the primary object of the invention to provide a trolley arm construction embodying a spring-actuated movable member on which the trolley wheels are mounted to move therewith, the movement of the movable member causing the trolley wheels to bear against the trolley wires at all times, insuring a true electric contact between the trolley wheels and trolley wires.

Another object of the invention is to provide a trolley arm of this character wherein the tension of the springs operating against the movable member on which the trolley wheels are supported, may be adjusted regulating the action of the movable member of the trolley arm.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is an elevational view illustrating the movable beam of an electric crane showing a trolley arm and movable carriage supporting the trolley arm operating therewith.

Fig. 2 is an enlarged elevational view of the improved trolley arm.

Fig. 3 is an edge elevational view thereof.

Fig. 4 is a rear elevational view of the trolley arm.

Fig. 5 is a sectional view taken on line 5—5 of Fig. 2.

Referring to the drawings in detail, the reference character 5 indicates the traveling beam of an electric crane, which supports the track sections 6 over which the usual carriage on which the various motors of the crane are mounted, operates.

Mounted on the traveling beam of the usual trolley wires 8 which are arranged in vertical spaced relation with respect to each other, the trolley wires lead from a source of electricity supply so that they will supply electric energy to certain of the motors, mounted on the carriage 7.

The reference character 9 indicates the trolley arm forming the subject matter of the present invention and as shown, comprises the angle bar 10 that has the flange 11 thereof disposed outwardly, the angle bar being provided with bolt openings 12 through which bolts may be extended to secure the trolley arm to the carriage 7.

Secured to the rear surface of the angle bar 10 is the plate 13 which is rectangular in formation and provided with a rectangular cut-out portion 14 disposed substantially centrally thereof, the cut-out portion defining supporting sections 15, the supporting section at one side of the plate extending beyond the inner longitudinal edge of the angle bar 10.

Secured to the plate 13 is the spacing plate 16 which is of a width less than the width of the supporting surface 15.

The reference character 17 indicates a plate which is secured to the outer surface of the angle bar 10 by means of bolts 18, the plate 17 being of a width to extend beyond the inner longitudinal edge of the angle bar 10, providing a guideway for the movable plate 19 which has one of its edges mounted within the guideway as clearly shown by Fig. 5 of the drawing.

Bolted to the plate 13 and spacing plate 16, is the plate 20, which is of a width greater than the width of the spacing plate 16 so that a guideway at this side of the trolley arm is provided in which the opposite edge of the movable plate 19 moves. Bolts 21 secure the plates 15, 16 and 20 together.

The reference character 22 indicates a lower flange which is welded to the lower end of the arm and extends outwardly in horizontal relation with respect to the angle bar 10.

This lower flange 22 provides a support for the guide pins 23 that have their lower ends welded to the lower flange 22. The guide pins 23 extend through openings formed in the bar 24 which moves vertically over the pins 23, the bar 24 providing a stop for the lower ends of the coil springs 25 that are positioned over the pins 23, with the upper ends of the springs resting against the angle plate 26 which has openings to receive the upper ends of the pins 23. Thus it will be seen that due to this construction the springs 25 normally urge the angle plate 26 upwardly. This angle plate 26 is welded to the lower end of the movable plate 19, so that movement of the angle plate will be transmitted to the movable plate 19, or vice versa.

The lower flange 22 is formed with a threaded opening through which the adjusting screw 27 operates, the upper end of the adjusting screw engaging the bar 24 so that the rotation of the adjusting screw will operate to tension the coil springs.

Extending laterally from the movable plate 19 and arranged in vertical spaced relation with respect to each other, are the trolley wheel supporting arms 28 on which the trolley wheels 29 are mounted, the arms 28 being insulated from the main portion of the trolley arm, by means of the insulators 30. Contacts 31 are disposed between the trolley wheels 29 and insulators 30, providing means whereby the various wires which are encased in the tube 32, may be connected with the trolley wheel supporting arms so that electric energy may pass from the wheels to the motors which have electrical connection with the wires in the cable 32.

In operation, the cables rest on the trolley wheels 29, and because of the action of the springs 25, against the angle plate 26 and movable plate 19, the trolley wheels will be urged upwardly into direct contact with the trolley wires insuring a true circuit.

It will be obvious that if slack occurs in the trolley wires, the constant upward pressure of the trolley wheels will cause the trolley wheels to contact the trolley wires 8 throughout the entire lengths of the trolley wires, even though the trolley wires slope downwardly at their ends, due to slack in the trolley wires.

From the foregoing detailed description, it is believed that the construction and operation of the trolley arm with its movable trolley wheel support, will be clearly obvious and that further disclosure is unnecessary.

Having thus described the invention, what is claimed is:

1. A trolley arm for use with multiple trolleys, comprising a base plate having a rectangular opening formed therein, a movable plate mounted on the base plate over said opening, arms secured to the plate and being insulated from the plate, trolley wheels mounted at the outer ends of the arms and on which the trolley wires rest, plates secured to the base plate with portions thereof overlying the side edges of the movable plate, holding the movable plate in position on the base plate, and yieldable means connected with the movable plate and base plate, normally urging the movable plate in one direction forcing the trolley wires into engagement with the trolleys associated therewith.

2. A trolley arm for use with multiple trolleys of a traveling crane, comprising a base plate, guideways on the base plate, a vertically sliding plate having its side edges operating within the guideways, a plurality of trolley wheels supported in vertical spaced relation with respect to each other, mounted on the vertically sliding plate on which the trolleys rest, and yieldable members supported by the base plate normally urging the vertically sliding plate and trolley wheels towards the trolley lines associated therewith.

3. A trolley arm for use with multiple trolley wires of a crane, comprising a base plate, a lower flange stationary with the base plate, guideways on the base plate, a movable plate having its longitudinal side edges held within the guideways for movement longitudinally thereof, an angle plate secured to the lower end of the movable plate in alignment with the lower flange, vertical guide pins secured to the lower flange, a bar having openings into which the pins extend, mounted for aligning movement on the pins, said pins also passing through openings in the angle plate, coiled springs surrounding the pins, the coiled spring being disposed between the angle plate and lower flange urging the angle plate and movable plate upwardly, and trolley wheels suuported on the movable plate for contact with trolley wires with which the device is used.

4. A trolley arm for use with trolley wires of a crane, comprising a bar secured to the carriage of the crane, a trolley wheel plate connected with the arm, a vertically movable plate on the trolley wheel plate, trolley wheels supported on the vertically movable plate and adapated to engage trolley wires, and yieldable means connected with the trolley wheels plate and vertically movable plate, whereby the trolley wheel plate is moved longitudinally of the trolley wheel plate urging the trolley wheels mounted thereon into engagement with the trolley wires in contact therewith.

EUGENE W. BURROUGHS, Sr.
WILLIAM J. BYRD.
MILES P. SEAWELL.

No references cited.